(12) United States Patent
Koskinen

(10) Patent No.: US 12,549,474 B2
(45) Date of Patent: Feb. 10, 2026

(54) CONFIGURING ROUTING IN NETWORKS

(71) Applicant: Nokia Solutions and Networks Oy, Espoo (FI)

(72) Inventor: Henri Markus Koskinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 268 days.

(21) Appl. No.: 18/553,133

(22) PCT Filed: Mar. 22, 2022

(86) PCT No.: PCT/EP2022/057407
§ 371 (c)(1),
(2) Date: Sep. 28, 2023

(87) PCT Pub. No.: WO2022/228780
PCT Pub. Date: Nov. 3, 2022

(65) Prior Publication Data
US 2024/0380688 A1 Nov. 14, 2024

(30) Foreign Application Priority Data
Apr. 26, 2021 (EP) .................................. 21170497

(51) Int. Cl.
*H04L 45/28* (2022.01)
*H04L 45/18* (2022.01)
(Continued)

(52) U.S. Cl.
CPC .............. *H04L 45/28* (2013.01); *H04L 45/18* (2013.01); *H04W 40/22* (2013.01); *H04W 40/248* (2013.01)

(58) Field of Classification Search
None
See application file for complete search history.

(56) References Cited

U.S. PATENT DOCUMENTS

| 8,411,688 B2 | 4/2013 | Farkas et al. |
| 8,532,109 B2 | 9/2013 | Su et al. |

(Continued)

FOREIGN PATENT DOCUMENTS

| WO | 2020/108737 A1 | 6/2020 |
| WO | 2020/167186 A1 | 8/2020 |
| WO | 2021/027949 A1 | 2/2021 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

(Continued)

*Primary Examiner* — Xavier S Wong
(74) *Attorney, Agent, or Firm* — SQUIRE PATTON BOGGS (US) LLP

(57) ABSTRACT

Apparatuses and methods in a communication system are disclosed. A relay node in a network is disclosed. The network comprises a set of nodes operationally connected to the relay node. The relay node receives (500) a routing configuration, receives (502) a packet to be routed, reads (504) at least one header field of the packet, selects (506) a route for forwarding the packet based on the at least one header field and the routing configuration, applies (508) at least one restriction related to the packet based on at least one of the routing configuration and the at least one header field, and forwards (510) the packet to the selected route.

14 Claims, 5 Drawing Sheets

Figure 1:
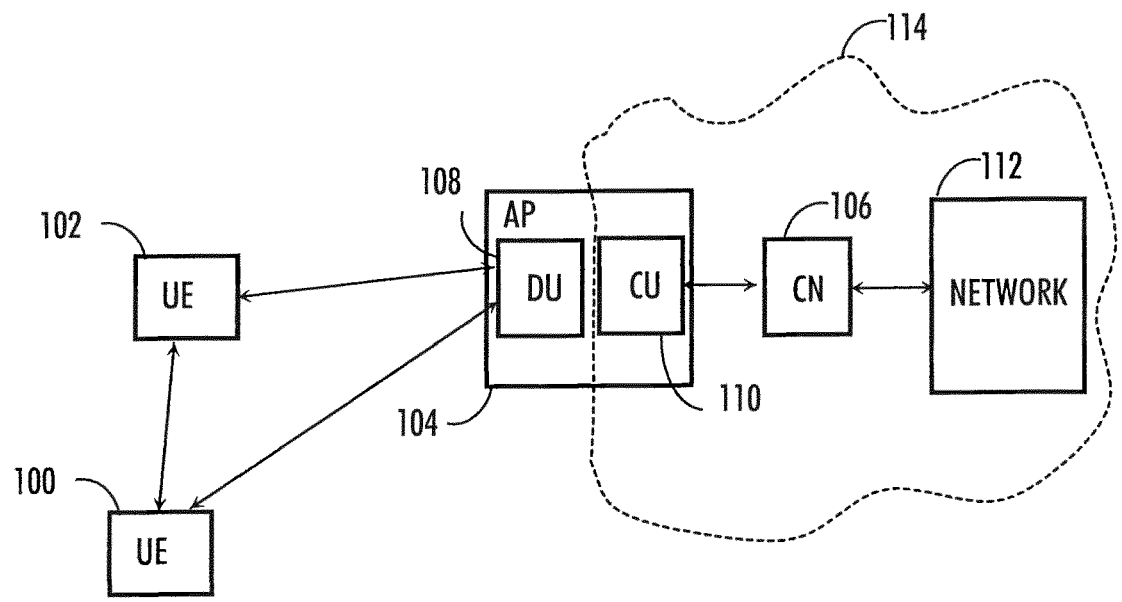

(51) Int. Cl.
*H04W 40/22* (2009.01)
*H04W 40/24* (2009.01)

(56) References Cited

U.S. PATENT DOCUMENTS

| | | | |
|---|---|---|---|
| 9,350,641 B2 | 5/2016 | Bejerano et al. | |
| 9,692,667 B2 | 6/2017 | Kompella et al. | |
| 10,178,025 B2 | 1/2019 | Means | |
| 2012/0069847 A1* | 3/2012 | Saad | H04L 45/04 370/392 |
| 2012/0307625 A1* | 12/2012 | Ravindran | H04L 45/18 370/258 |
| 2022/0225129 A1* | 7/2022 | Chen | H04L 45/28 |
| 2023/0179518 A1* | 6/2023 | Vangala | H04W 28/0252 709/238 |

OTHER PUBLICATIONS

"3rd Generation Partnership Project; Technical Specification Group Radio Access Network; NR; Backhaul Adaptallon Protocol (BAP) specification (Release 16)", 3GPP TS 38.340, V16.3.0, Dec. 2020, pp. 1-22.

"New WID on Enhancements to Integrated Access and Backhaul", 3GPP TSG RAN Meeting #86, RP-193251, Agenda: 9.1.2, Qualcomm Dec. 9-12, 2019, 5 pages.

"Rel-17 IAB email discussion—report", 3GPP TS RAN meeting #86, RP-193094, Agenda: 9.1.2, Qualcomm Incorporated, Dec. 9-12, 2019, 39 pages.

"3rd Generation Partnership Project; Technical Specification Group Radio Access Network; NG-RAN; Architecture description (Release 16)", 3GPP TS 38.401, V16.4.0, Jan. 2021, pp. 1-78.

"BL CR to 38.401 Support for IAB", 3GPP TSG RAN WG3 Meeting #107bis-e, R3-201597, Huawei. Apr. 20-30, 2020, 18 pages.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network: NG-RAN; F1 application protocol (F1AP) (Release 16)", 3GPP TS 38.473, V16.4.0, Jan. 2021, pp. 1-461.

"[Post112-e][066][eIAB] Topology Adaptation (QC)", 3GPP TSG-RAN WG2 Meeting #113e, R2-20xxxxx, Agenda Item; Probably 8.4.3, Qualcomm Incorporated, pp. 1-10.

Tsou, "Realm-Based Redirection in Diameter draft-tsou-dime-realm-based-redirect-00", Internet Engineering Task Force, Internet-Draft, Jun. 11, 2009, pp. 1-6.

Extended European Search Report received for corresponding European Patent Application No. 21170497.8, dated Oct. 18, 2021, 7 pages.

"Route priority and local routing", 3GPP TSG-RAN WG2 108, R2-1915699, Agenda Item: 6.1.5.1, Nokia, Nov. 18-22, 2019, 3 pages,.

International Search Report and Written Opinion received for corresponding Patent Cooperation Treaty Application No. PCT/EP2022/057407, dated Jun. 24, 2022, 10 pages.

Office action received for corresponding European Patent Application No. 21170497.8, dated Mar. 21, 2025, 7 pages.

* cited by examiner

CONFIGURING ROUTING IN NETWORKS

RELATED APPLICATION

This application was originally filed as PCT Application No. PCT/EP2022/057407 on Mar. 22, 2022, which claims priority from EP Application Serial No. 21170497.8, filed on Apr. 26, 2021, each of which is incorporated herein by reference in its entirety.

FIELD

The exemplary and non-limiting embodiments of the invention relate generally to communication systems. Embodiments of the invention relate especially to apparatuses and methods in wireless communication networks.

BACKGROUND

The use of wireless communication systems is constantly increasing in many application areas. Communication that was previously realised with wired connections is replaced by wireless connections as the wireless communication systems offer many advantages over wired systems.

The use of wireless links is increasing also on the infrastructure side. The robustness of the wireless solutions is an important issue. If a wireless link fails a recovery of the link should be realised with a minimum delay but with large reliability.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of claims 1 and 7.

According to an aspect of the present invention, there are provided methods of claims 9 and 13.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Figure 2:
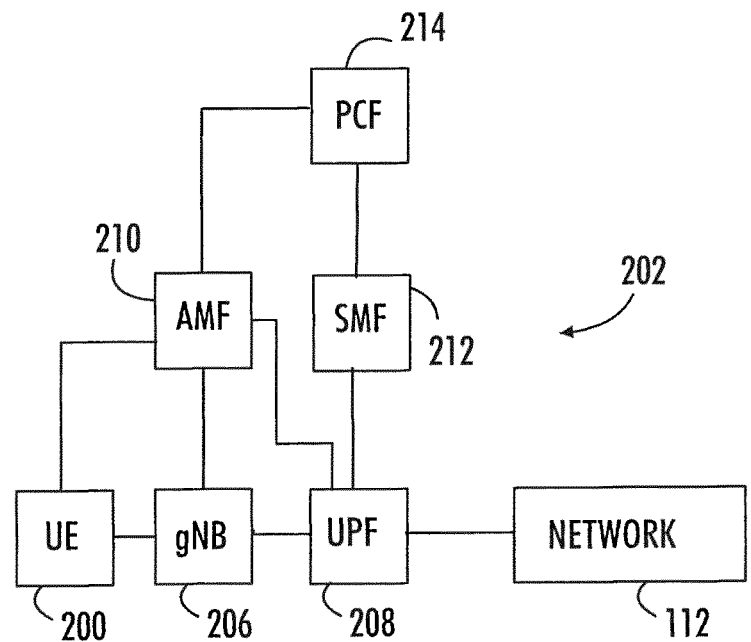
Figure 3:
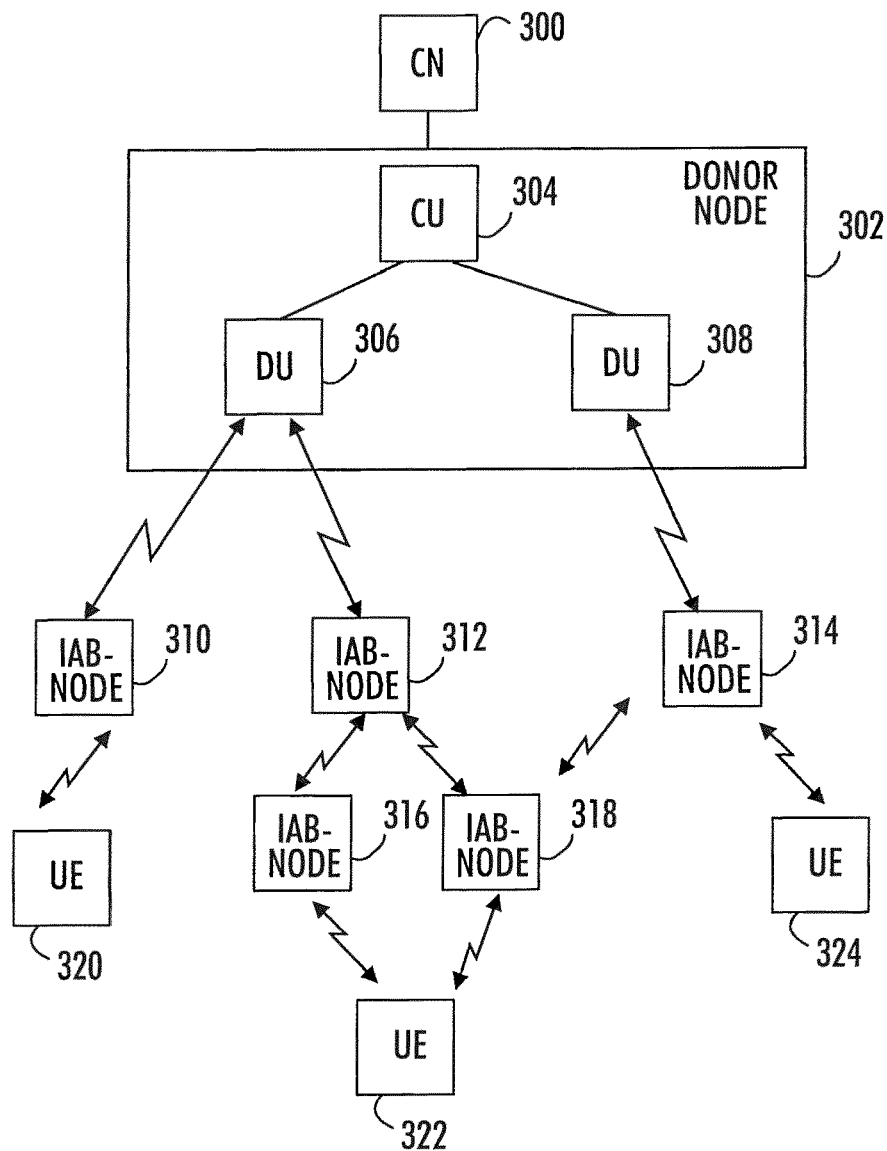
Figure 4:
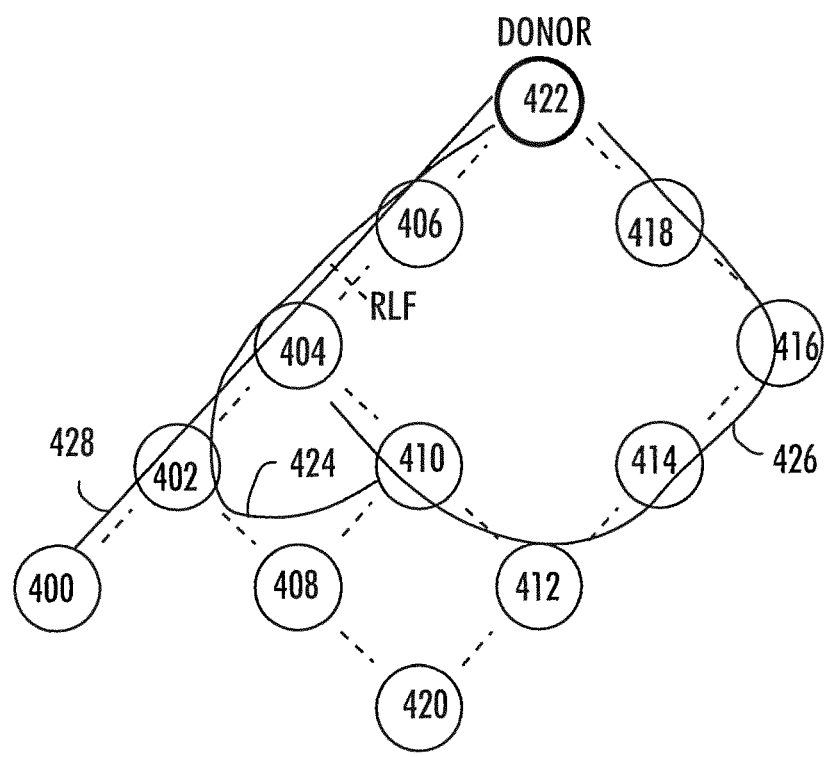
Figure 5A:
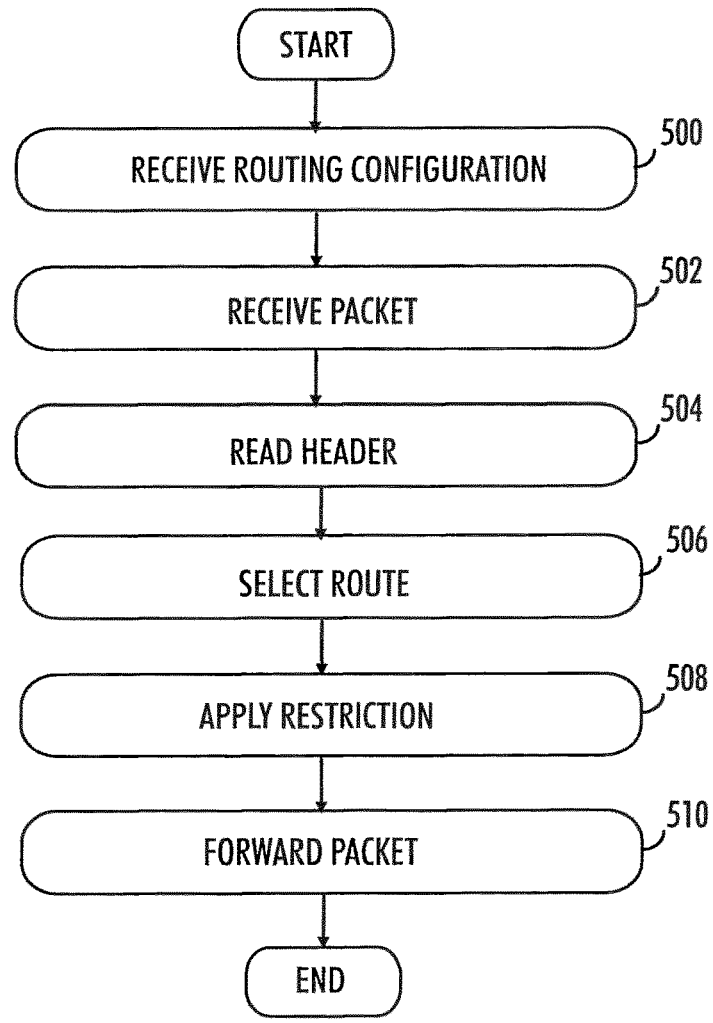
Figure 5B:
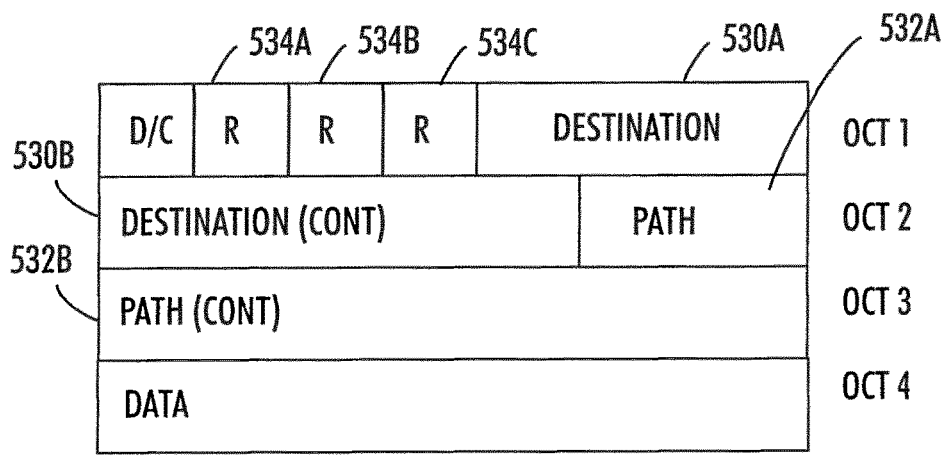
Figure 6:
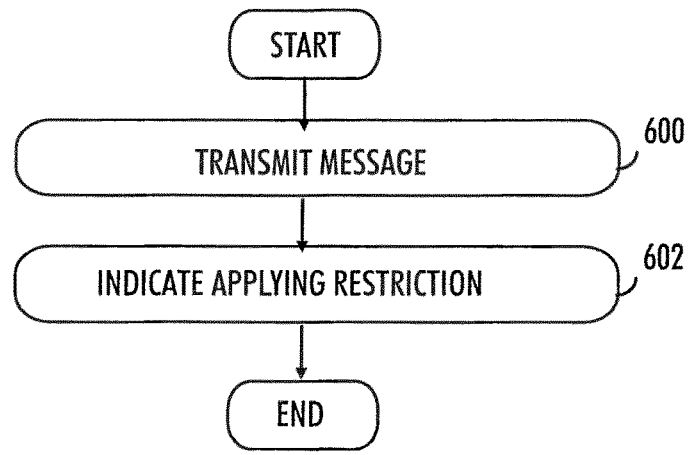
Figure 7A:
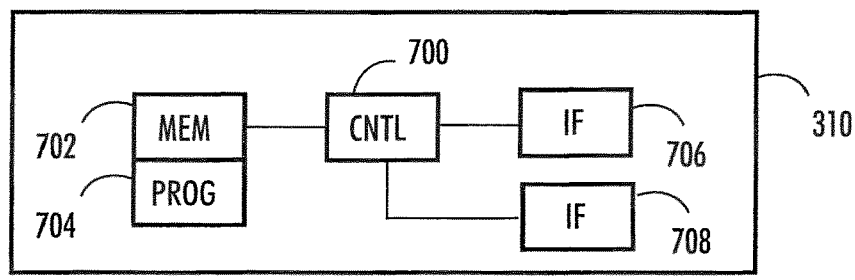
Figure 7B:
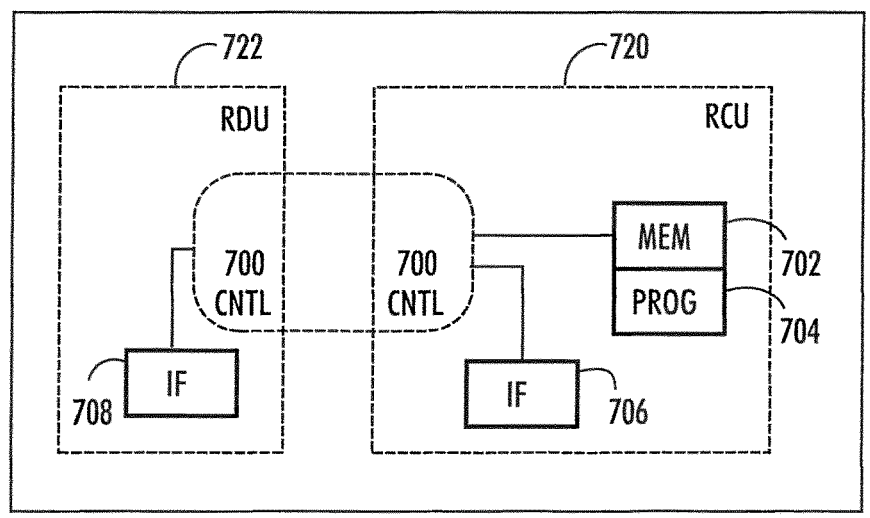

Embodiments of the present invention are described below, by way of example only, with reference to the accompanying drawings, in which FIGS. 1 and 2 illustrate examples of simplified system architecture of a communication system;
FIG. 3 illustrates an example of a network architecture;
FIG. 4 illustrates an example of loop-back routes;
FIG. 5A is a flowchart illustrating an embodiment;
FIG. 5B illustrates an example of a header of a packet;
FIG. 6 is a flowchart illustrating an embodiment; and FIGS. 7A and 7B illustrate simplified examples of apparatuses applying some embodiments of the invention.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one ore more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc.

The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a central unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

FIG. 2 illustrates an example of a communication system based on 5G network components. A user terminal or user equipment 200 communicating via a 5G network 202 with a data network 112. The user terminal 200 is connected to a Radio Access Network RAN node, such as (e/g)NodeB 206 which provides the user terminal with a connection to the network 112 via one or more User Plane Functions, UPF 208. The user terminal 200 is further connected to Core Access and Mobility Management Function, AMF 210, which is responsible for handling connection and mobility management tasks and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function, PCF 214 which is configured to govern network behavior by providing policy rules to control plane functions.

In earlier communication systems, where mobile terminals communicated with other terminals and landline terminals, the connections within the fixed network part of communication system were realised with wired connections. However, recently there have been proposals and designs of providing wireless connections between the network elements of a communication system. For example, in the current proposals for 5G or NR networks, there has been proposals for wireless backhauling for at least some access nodes. Wireless backhauling to access nodes would enable placing such nodes to locations where there is no fixed (for example wired and/or fibre) connection to other network elements. Utilising a radio connection for backhauling provides a way to avoid installing cabling to those nodes. This would reduce the installation costs of such nodes.

In 5G or NR, the above procedure has been called Integrated access and backhaul (IAB), which enables wireless relaying between network elements in NG-RAN. The relaying node, denoted as IAB-node, supports access and backhauling via NR-RAN. The terminating node of NR backhauling on network side is denoted as a donor node or IAB-donor, which represents a gNB with additional functionality to support IAB. Backhauling can be realised via a single hop or multiple hops.

In IAB, a Backhaul Adaptation Protocol, BAP, is utilised above Radio Link Control, RLC, on backhaul radio links serving IAB nodes for the purpose of connecting towards the fixed network. BAP is responsible, for example, for routing packets towards their destinations as defined by the Routing ID (consisting of Destination and Path parts) that is part of the Backhaul Adaptation Protocol-Protocol Data Unit, BAP-PDU, header of the relayed packets.

FIG. 3 illustrates an example of a network where IAB architecture is applied.

FIG. 3 shows core network 300 and an IAB-donor node 302 connected to the core network. The donor node 302 comprises a central unit, CU, for at least some IAB nodes of the network. Thus, it is configured to run Radio Resource Control, RRC, layer 2 Packet Data Convergence Protocol, PDCP, and control functions. In an embodiment, the central unit comprises a control plane, CU-CP, function, and a user plane CU-UP, function. The User Plane Function, UPF, is the gateway functionality which is a core network function but can be included in the IAB nodes to establish a protocol data unit, PDU, session between a serving node and served node to carry backhaul.

The donor node 302 may further comprise distributed units, DUs, 306, 308, configured to run radio link control, RLC, medium access control MAC and physical layer, PHY. Thus, the central unit coordinates the radio resources usage of the donor node.

In IAB architecture, wireless relaying between at least some network elements is used. Also multi-hop relaying is supported. In multi-hop relaying, an IAB node may provide a wireless backhauling connection for a next hop IAB node. The serving node providing the backhauling connection is called a parent node where the node can be either a donor node (with wired network connection), or another IAB node. The served IAB node is called a child node.

FIG. 3 further shows IAB nodes 310, 312, 314 wirelessly connected to the distributed units of the donor node 302. Here the distributed unit 306 is the parent node for IAB nodes 310, 312 which may be denoted as child nodes. Correspondingly, the distributed unit 308 is the parent node for IAB node 314.

Further, IAB node 312 is a parent node for IAB nodes 316, 318. It is also possible that an IAB node child may have two or more parent nodes. In FIG. 3, IAB node 318 has another parent in node 314.

In FIG. 3, terminal devices 320, 322, 324 are served by IAB nodes.

In an embodiment, the IAB-nodes relay messages of other nodes to the donor node. To increase reliability, it has been proposed that it would be possible to relay messages using more than one route. The structure of the IAB network allows this as there maybe more than one parent nodes and child nodes for each node. In the simplified example of FIG. 3, the IAB node 314 may relay a message to the donor 302 directly or via the IAB nodes 318 and 312. The route through nodes 318, 320 may be denoted as a loop-back route. In such a route there are both child-to-parent hops and parent-to-child hops.

Below following terms are used:
Downlink: direction on a (backhaul) link toward an IAB node from its parent node.
Uplink: direction on a link from an IAB node toward its parent node.
Downstream: direction of traffic from an IAB-donor toward an IAB node (possibly over multiple backhaul-link hops).
Upstream: direction of traffic toward an IAB-donor from an IAB node (possibly over multiple backhaul-link hops).
Loop-back route: A multi-hop route between an IAB-donor and an IAB node containing both uplink and downlink hops.

In the current 5G release, Rel-16, IAB only supports routing paths where the upstream/downstream direction only goes over uplink/downlink hops, respectively.

A IAB relay node utilises BAP when relaying packets. It performs routing of packets based on a backhaul Routing Configuration is has received from its donor node. Currently, an entry in the Routing Configuration comprises a BAP Routing ID consisting of a BAP address and a BAP path identity, Path ID, and a Next Hop BAP Address.

As currently standardized, for a BAP PDU to be relayed by an IAB relay node, if there is no entry in the PDU header in the routing configuration of the node whose Routing ID matches the Destination and Path fields in the header of the PDU and whose egress link corresponding to Next Hop BAP Address is available, the IAB node is free to select any available egress link that matches with the Destination in the PDU header. This feature is denoted below as Feature 1.

Further, when relaying a BAP packet, an IAB node never alters the Routing ID (Destination and Path fields) in the header of the packet. This is the case even in the process of re-routing onto a path that does not fully match the path in the header of a received packet. This feature is denoted below as Feature 2.

The introduction of loop-back routes presents some potential problems. In some situations, routing loops may appear. This is illustrated in the example of FIG. 4.

FIG. 4, shows IAB nodes 400-420 and a donor node 422. In FIG. 4, the terminal devices served by the IAB nodes are not shown. Loop-back routes having Path IDs 424 and 426 have been configured.

Assuming routing operation according to 5G release 16, the following sequences of events can take place.

Step 1: The node 404 receives a BAP PDU created by the node 400.

The header information of the PDU indicates the Donor DU's BAP address as the destination and Path ID is 428.

Step 2: However, before relaying the PDU, the node 404 has observed that there is a radio link failure, RLF, on the link to its parent node 406. Consequently, the node 404 is configured to send the PDU via the route 426 instead.

Step 3: Next, the PDU is received by the node 410.
Now there are two following options:
Step 4: Case 1:
Step 4.1 As described above in Feature 2, the PDU header still indicates Path ID equals 428, which is absent in the routing configuration of the node 410. Based only on the Destination field of the header of the PDU, the node 410 chooses to send the PDU via the Path 424.
Step 4.2: The PDU reaches again the node 404, via nodes 408 and 402.
Step 4.3: The above steps 2-4.2 repeat, and the PDU is stuck in a routing loop.
Step 5: Case 2:
Step 5.1: Link between nodes 410 and 412 has a radio link failure (not shown in the figure), and the node 410 chooses to send the PDU via the Path 424.
Step 5.2: Via nodes 408, 402 the PDU reaches again the node 404.
Step 5.3: Steps 2-5.2 (excluding step 4 specific to Case 1) repeat, and the PDU is stuck in a routing loop.

It may be noted that, instead of a radio link failure, the re-routing decisions in the above examples could be due to other, milder reasons such as congestion.

The above example shows that routing loops, containing segments of one or more loop-back routes, may form if re-routing decisions independently made by IAB nodes are allowed in presence of loop-back routes. Thus, there is a need to prevent routing loops.

The flowchart of FIG. 5A illustrates an embodiment. The flowchart illustrates an example of the operation of an apparatus. In an embodiment, the apparatus may be a network element such as a relay node or an IAB node or a part of a node, in a network, the network comprising a set of nodes operationally connected to the relay node or IAB node.

In step 500, the relay node is configured to receive a routing configuration. In an embodiment, the configuration is sent by the Donor CU of the relay node.

In step 502, the relay node is configured to receive a packet to be routed.

In step 504, the relay node is configured to read at least one header field of the packet. The header comprises Destination and Path fields, for example.

In step 506, the relay node is configured to select a route for forwarding the packet based on the routing configuration and the at least one header field.

In step 508, the relay node is configured to, based on at least one of the routing configuration and the at least one header field, apply at least one restriction related to the packet.

In step 510, the relay node is configured to forward the packet to the selected route.

In an embodiment, the at least one restriction comprises modifying the header of the packet to indicate the selected route in a case where the selected route has a given attribute in the routing configuration.

In an embodiment, the relay node is configured to modify destination and path header fields of the packet to match the selected route.

In an embodiment, the relay or IAB node may have in its routing configuration information that if a PDU is forwarded on a route with a given attribute, the IAB node is configured to ensure that the Routing-ID header fields of the PDU are set to indicate the Routing ID of that route. Thus, the proposed first attribute would cause an IAB node to deviate from Feature 2 described above.

In the example of FIG. 4, such setting in header field would inform node 410 of the intention of node 404 to send the PDU along the loop-back route 426.

In an embodiment, the at least one restriction comprises restricting the selection of the route among routes not matching the destination and path fields in a case where at least one of the header of the packet and the routing configuration indicates that the restriction to the route selection applies.

In an embodiment, the relay or IAB node may be configured to restrict the selection of the route in a case the header of the packet comprises a field indicating restriction. The IAB or relay node may be configured to store destination and path pair data for which selection of the route is restricted and restrict the selection of the route if the destination and the path in the header of the packet are among the stored data.

The relay or IAB node may be configured to store destination and path pair data for which selection of the route is restricted and restrict the selection of the route if the destination and the path in the header of the packet are among the stored data.

In an embodiment, the relay or IAB node may be configured to receive an indication that re-routing of some BAP PDUs is restricted or disallowed. In such a case, for such PDUs, the only allowed egress link toward the PDU's destination is the one configured as "Next hop" for the Routing ID in the header information of the PDU.

In an embodiment, the relay node is configured with a set of Routing IDs for which, when indicated in the header of a received PDU, re-routing is disallowed.

In an embodiment, this set of Routing IDs could be the set of Routing IDs for which the attribute mentioned above is set. However, another, second attribute may be used for allowing configuration of these sets separately.

In the example of FIG. 4, since from node 412 onwards toward the Donor node the path 426 is not a loop-back route, node 412 could re-route packets from other routes (not shown in the figure) onto the path 426, but there seems to be no compelling reason for altering the Routing-ID headers of such packets accordingly. In contrast, it still seems important that node 412 does not re-route packets indicating the path 426 received from node 410 onto another path (not shown in the figure) via node 422.

In an embodiment, a new header field may be applied in a BAP PDU indicating that re-routing of the PDU is disallowed.

FIG. 5B illustrates an example of a header of a PDU. The header comprises Destination and Path fields 530A, 530B, 532A and 532B. In an embodiment, the relay or IAB node may read the Destination and Path pair in its routing configuration and determine whether for that pair re-routing is restricted or disallowed.

Currently, the header of the PDU comprises a set of unused fields 534A, 534B, 534C marked as 'R' for reserved. In an embodiment, one of the 'R' header bits may be used for indicating that re-routing of the PDU having this field set is restricted or disallowed. If a relay or IAB node receives a PDU, reads the header field 534 of the PDU and determines that the field 534 is set, it knows that there is re-routing restriction for that PDU.

In the example of FIG. 4, the re-routing restriction described above would force the PDU to stay on the loop-back route 426.

In an embodiment, the steps proposed above are applied to loop-back routes. Therefore, they would not be part of routing loops in the IAB network.

In IAB networks, the routing configuration of each IAB node comes from the Donor CU. The Donor CU is aware of all routes in the IAB network, and therefore also the routing loops that could form.

The flowchart of FIG. 6 illustrates an embodiment. The flowchart illustrates an example of the operation of an apparatus. In an embodiment, the apparatus may be a network element or a part of a network element such as a donor node of IAB network operationally connected to one or more relay nodes.

In step 600, the donor node is configured to transmit to a relay node a configuring message comprising routing configuration, the message comprising instructions to the relay node.

In step 602, donor node is configured to indicate to the relay node to, based on at least one of the routing configuration and at least one header field of a received packet, apply at least one restriction related to the packet.

In an embodiment, the at least one restriction comprises modifying the header of the packet to indicate the selected route in a case where the selected route has a given attribute in the routing configuration.

In an embodiment, the indication to a relay or IAB-node may include the routing IDs of all loop-back routes configured to the IAB node, regardless of where on that route the node is located. When this "safe-side" rule is relaxed, all possible re-routing combinations that could take place for a PDU in the node may be taken into account.

In an embodiment, donor node is configured to indicate to a relay or IAB node to modify routing identification header fields of the packet to indicate the route of the packet if the packet is to be rerouted and the selected route comprises a given attribute.

In an embodiment, donor node is configured to indicate to a relay or IAB node to modify routing identification header fields of the packet to indicate the route of the packet, if the route of the packet comprises both uplink and downlink hops between the IAB node and the route's destination.

FIGS. 7A, and 7B illustrate embodiments. The figures illustrate simplified examples of apparatuses applying embodiments of the invention. It should be understood that the apparatuses are depicted herein as examples illustrating some embodiments. It is apparent to a person skilled in the art that the apparatuses may also comprise other functions and/or structures and not all described functions and structures are required. Although the apparatuses have been depicted as one entity, different modules and memory may be implemented in one or more physical or logical entities.

FIG. 7A illustrates an embodiment. The figure illustrates a simplified example of an apparatus 314 applying embodiments of the invention. In some embodiments, the apparatus may be a network node or an IAB node or a part of a node.

The apparatus 314 of the example includes a control circuitry 700 configured to control at least part of the operation of the apparatus.

The apparatus may comprise a memory 702 for storing data. Furthermore, the memory may store software 704 executable by the control circuitry 700. The memory may be integrated in the control circuitry.

The apparatus may comprise one or more interface circuitries 706, 708. The interface circuitries are operationally connected to the control circuitry 700. An interface circuitry 706 may be a set of transceivers configured to communicate with other network elements of a wireless communication network. The interface circuitry may be connected to an antenna arrangement (not shown). An interface circuitry 708 may be a set of transceivers configured to communicate with terminal devices of a wireless communication network. The interface circuitry may be connected to an antenna arrangement (not shown). The apparatus may also comprise a connection to a transmitter instead of a transceiver. In an embodiment, the interfaces 706, 708 may be combined.

In an embodiment, the software 704 may comprise a computer program comprising program code means adapted to cause the control circuitry 700 of the apparatus to realise at least some of the embodiments described above.

In an embodiment, as shown in FIG. 7B, at least some of the functionalities of the apparatus of FIG. 7B may be shared between two physically separate devices, forming one operational entity. Therefore, the apparatus may be seen to depict the operational entity comprising one or more physically separate devices for executing at least some of the described processes. Thus, the apparatus of FIG. 7B, utilizing such shared architecture, may comprise a remote control unit RCU 720, such as a host computer or a server computer, operatively coupled (e.g. via a wireless or wired network) to a remote distributed unit RDU 722 located in the base station. In an embodiment, at least some of the described processes may be performed by the RCU 720. In an embodiment, the execution of at least some of the described processes may be shared among the RDU 722 and the RCU 720.

In an embodiment, the RCU 720 may generate a virtual network through which the RCU 720 communicates with the RDU 722. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, a relay node comprises at least one processor; and at least one memory including computer program code, the at least one memory and computer program code configured to, with the at least one processor, cause the apparatus to: receive a routing configuration;

receive a packet to be routed; read at least one header field of the packet; select a route for forwarding the packet based on the at least one header field and the routing configuration; based on at least one of the routing configuration and the at least one header field, apply at least one restriction related to the packet; and forward the packet to the selected route.

In an embodiment a donor node of a network, operationally connected to one or more relay nodes, comprises at least one processor; and at least one memory including computer program code, the at least one memory and computer program code configured to, with the at least one processor, cause the apparatus to: transmit to a relay node a configuring message comprising a routing configuration, the message instructing the relay node to, based on at least one of the routing configuration and at least one header field of a received packet, apply at least one restriction related to the packet.

It will be obvious to a person skilled in the art that, as the technology advances, the inventive concept can be implemented in various ways. The invention and its embodiments are not limited to the examples described above but may vary within the scope of the claims.

The invention claimed is:

1. A relay node comprising at least one processor, and at least one memory including computer program code, the at least one memory and computer program code configured to, with the at least one processor, cause the relay node to:
receive a routing configuration;
receive a packet to be routed;
read at least one header field of the packet;
select a route for forwarding the packet based on the at least one header field and the routing configuration, wherein the routing configuration comprises an attribute for indicating to the relay node whether to modify the at least one header field to indicate the selected route;
modify the at least one header field to indicate the selected route in response to determining that the selected route has the attribute in the routing configuration; and
forward the packet to the selected route,
wherein the routing configuration is a backhaul routing configuration,
wherein the packet comprises a Backhaul Adaptation Protocol (BAP) Protocol Data Unit (PDU), and
wherein the at least one header field is at least one header field of the BAP PDU.

2. The relay node of claim 1, wherein the attribute is indicative of the selected route being a loop-back route.

3. The relay node of claim 1,
wherein the at least one header field comprises destination and path fields, and
wherein the relay node is further caused to:
modify the destination and path fields to match the selected route.

4. The relay node of claim 1, wherein the at least one header field comprises destination and path fields,
and wherein the relay node is further caused to:
restrict the selection of the route among routes not matching the destination and path fields in a case where a header field of the at least one header field and the routing configuration indicate that a restriction to the route selection applies.

5. The relay node of claim 4, wherein the relay node is further caused to:
restrict the selection of the route in a case where a header field of the at least one header field indicate restriction.

6. The relay node of claim 4, wherein the relay node is further caused to:
store destination and path pair data for which selection of the route is restricted, and
restrict the selection of the route if the destination and the path fields are among the stored data.

7. A donor node comprising at least one processor, and at least one memory including computer program code, the at least one memory and computer program code configured to, with the at least one processor, cause the donor node to:
transmit, to a relay node, a configuring message comprising a routing configuration, the routing configuration comprising an attribute for indicating to the relay node whether to modify at least one header field of a received packet to indicate a route selected by the relay node, the configuring message instructing the relay node to modify the at least one header field to indicate the selected route in response to determining that the selected route has an attribute in the routing configuration,
wherein the routing configuration is a backhaul routing configuration,
wherein the packet comprises a Backhaul Adaptation Protocol (BAP) Protocol Data Unit (PDU), and
wherein the at least one header field is at least one header field of the BAP PDU.

8. The donor node of claim 7, wherein the attribute is indicative of the selected route being a loop-back route.

9. A method comprising, by a relay node:
receiving a routing configuration;
receiving a packet to be routed;
reading at least one header field of the packet;
selecting a route for forwarding the packet based on the at least one header field and the routing configuration, wherein the routing configuration comprises an attribute for indicating to the relay node whether to modify the at least one header field to indicate the selected route;
modifying the at least one header field to indicate the selected route in response to determining that the selected route has the attribute in the routing configuration; and
forwarding the packet to the selected route,
wherein the routing configuration is a backhaul routing configuration,
wherein the packet comprises a Backhaul Adaptation Protocol (BAP) Protocol Data Unit (PDU), and
wherein the at least one header field is at least one header field of the BAP PDU.

10. The method of claim 9, wherein the attribute is indicative of the selected route being a loop-back route.

11. The method of claim 9,
wherein the at least one header field comprises destination and path fields, and
wherein the method further comprises, by the relay node:
modifying the destination and path fields to match the selected route.

12. The method of claim 9,
wherein the at least one header field comprises destination and path fields, and
wherein the method further comprises, by the relay node:
restricting the selection of the route among routes not matching the destination and path fields in a case where a header field of the at least one header field and the routing configuration indicate that a restriction to the route selection applies.

13. The method of claim 12, wherein the method further comprises, by the relay node:
 restricting the selection of the route in a case where a header field of the at least one header field indicates the restriction.

14. The method of claim 12, wherein the method further comprises, by the relay node:
 storing destination and path pair data for which selection of the route is restricted, and
 restricting the selection of the route if the destination and the path fields are among the stored data.

* * * * *